United States Patent
Lamb et al.

(10) Patent No.: US 7,383,042 B2
(45) Date of Patent: Jun. 3, 2008

(54) INTEROPERABLE VOICE AND DATA WIRELESS NETWORK

(75) Inventors: James A. Lamb, Elkhorn, NE (US); Richard Piper, McKinney, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 718 days.

(21) Appl. No.: 10/417,617

(22) Filed: Apr. 17, 2003

(65) Prior Publication Data

US 2004/0209615 A1 Oct. 21, 2004

(51) Int. Cl.
- H04Q 7/20 (2006.01)
- H04M 3/42 (2006.01)
- H04M 1/00 (2006.01)
- H04B 1/38 (2006.01)

(52) U.S. Cl. ............... 455/433; 455/412.2; 455/445
(58) Field of Classification Search ............ 455/433, 455/411, 419, 553.1, 461, 435, 418, 432.3, 455/445, 432.34, 417, 566, 567, 554.1, 560, 455/435.1, 412.2; 370/356, 310, 349, 352
See application file for complete search history.

(56) References Cited

U.S. PATENT DOCUMENTS

| | | | |
|---|---|---|---|
| 6,101,387 A | 8/2000 | Granberg et al. | |
| 6,434,385 B1 | 8/2002 | Aucoeur | |
| 6,445,929 B2 | 9/2002 | Chandnani et al. | |
| 6,452,910 B1 | 9/2002 | Vij et al. | |
| 6,510,310 B1 | 1/2003 | Muralidharan | |
| 6,526,033 B1 | 2/2003 | Wang et al. | |
| 6,526,034 B1 | 2/2003 | Gorsuch | |
| 6,662,017 B2* | 12/2003 | McCann et al. | 455/461 |
| 6,683,871 B1* | 1/2004 | Lee et al. | 370/356 |
| 6,694,134 B1* | 2/2004 | Lu et al. | 455/419 |
| 6,795,701 B1* | 9/2004 | Baker et al. | 455/411 |
| 6,853,851 B1* | 2/2005 | Rautiola et al. | 455/553.1 |
| 6,912,389 B2 | 6/2005 | Bright et al. | |
| 6,944,150 B1* | 9/2005 | McConnell et al. | 370/352 |
| 6,956,832 B1* | 10/2005 | Muhonen et al. | 370/310 |
| 7,072,653 B1* | 7/2006 | Sladek et al. | 455/432.3 |
| 2002/0065097 A1 | 5/2002 | Brockenbrough et al. | |
| 2002/0082029 A1 | 6/2002 | Ahmad et al. | |
| 2002/0111167 A1* | 8/2002 | Nguyen et al. | 455/435 |
| 2003/0171112 A1 | 9/2003 | Lupper et al. | |
| 2003/0224795 A1* | 12/2003 | Wilhoite et al. | 455/445 |

(Continued)

FOREIGN PATENT DOCUMENTS

JP PUPA 2002-320255 1/2002

(Continued)

OTHER PUBLICATIONS

The EP Search Report, 3pp. (Jul. 26, 2004).

(Continued)

Primary Examiner—Thjuan K Addy

(57) ABSTRACT

An embodiment of the present invention includes a wireless architecture having a mobile device, a voice network, a data network, and a home location register (HLR). The HLR is operably connected to the voice network and the data network. The HLR is operable to initiate a message to the mobile device, via the data network, that a voice session is waiting to be transmitted to the mobile device via the voice network.

31 Claims, 5 Drawing Sheets

U.S. PATENT DOCUMENTS

2004/0127205 A1* 7/2004 Mahajan ..................... 455/418
2005/0232222 A1* 10/2005 McConnell et al. ........ 370/349

FOREIGN PATENT DOCUMENTS

| | | |
|---|---|---|
| JP | PUPA 2003-502964 | 1/2003 |
| WO | WO9726764 | 7/1997 |
| WO | WO 00/79827 | 12/2000 |
| WO | WO0219617 | 3/2002 |

OTHER PUBLICATIONS

3GPP: "3rd Generation Partnership Project; Technical Specificaiton Group Services and System Aspects; WLAN Subsystem; System Description (Release 6)" Sep. 2002.

* cited by examiner

INTEROPERABLE VOICE AND DATA WIRELESS NETWORK

A Public Switched Telephony Network (PSTN) refers to the public phone networks as known by those of ordinary skill in the art. The PSTN is composed of switches and T1/E1 trunks, central office, etc. The PSTN uses circuit-switched technology, in which necessary resources are allocated (dedicated) for the duration of a phone call. An IP network (e.g., the Internet), in contrast, is composed of nodes of computers, servers, routers, and communications links, etc. The IP network employs packet-switching technology that decomposes data (e.g., voice, web pages, e-mail messages, etc.) into IP packets. Each packet is then transmitted over an IP network to a destination identified by an IP address and reassembled at the destination. An IP transmission is completed without pre-allocating resources from point to point.

Mobile handheld multifunction devices capable of both voice and data functions have proliferated in recent years. Certain mobile devices are capable of multiple network type connections. However, once a connection to a given network is made, the radio of a given mobile device will not acknowledge other network communications.

DETAILED DESCRIPTION

Embodiments of the present invention provide for the interoperability of a wireless data deployment with a wireless voice, e.g. cellular, deployment. As one of ordinary skill in the art will understand, the embodiments can be performed by software, application modules, and computer executable instructions operable on the systems and devices shown herein or otherwise. The invention, however, is not limited to any particular operating environment or to software written in a particular programming language. Software, application modules and/or computer executable instructions, suitable for carrying out embodiments of the present invention, can be resident in one or more devices or locations or in several and even many locations.

Unless explicitly stated, the method embodiments described herein are not constrained to a particular order or sequence. Additionally, some of the described method embodiments can occur or be performed at the same point in time.

As one of ordinary skill in the art will appreciate upon reading this disclosure, a wireless infrastructure can provide cellular/PCS services like call origination and call delivery for a roaming mobile device or handset. For call delivery, a visited network tracks the location of a roaming user and a visitor location register (VLR) reports that location information via a control network to the home location register (HLR) of the home network. Control networks may include ANSI/IS-41 and GSM MAP types of networks. An authentication center (AC) in a home network can be used for user registration and authentication, e.g., checking to see, among other things, if the user has made payments. When a call is relayed from the public switched telephony network (PSTN) to the home mobile switching center (MSC) is to be delivered to a subscriber, the home MSC consults the HLR to determine the current whereabouts of the subscriber, e.g. the current serving/visited MSC, and the call is then directed via links and the PSTN to the visited MSC currently serving the mobile device.

Figure 1:
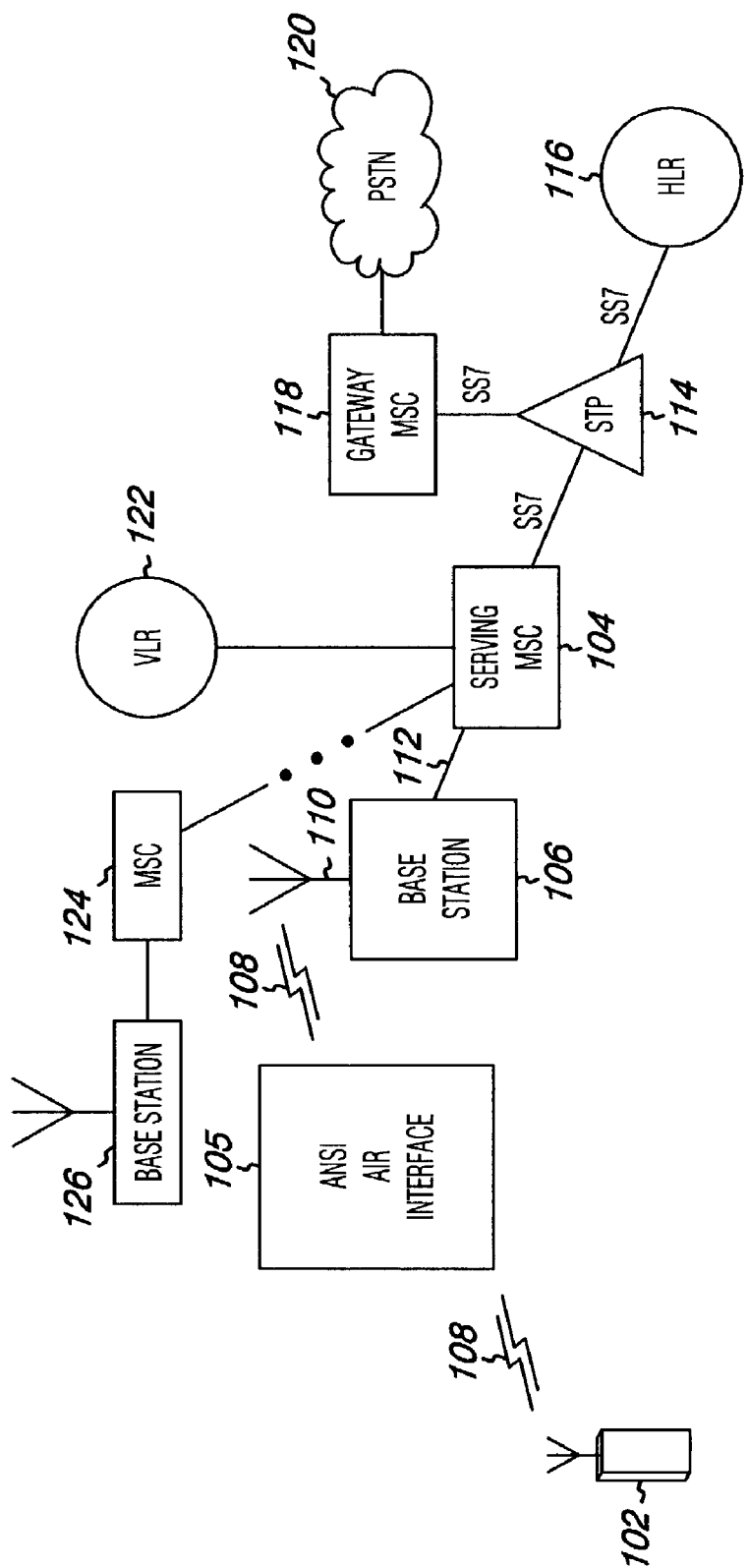
FIG. 1 is a block diagram of a mobile network illustrating a mobile device communicating with a mobile switching center.

FIG. 1 is a block diagram of a mobile network illustrating a mobile device 102 communicating with a mobile switching center (MSC) 104. One example of a mobile network, or control network, includes an IS-41/CDMA network. System configuration and operation of a code division multiple access (CDMA) cellular communications system is well known to those skilled in the art. Accordingly, detailed information concerning CDMA system configuration and operation is not provided. However, technical information concerning this topic may be obtained by referring to a number of available documents. For example, for a description of the use of CDMA techniques in a multiple access communications system, reference is made to U.S. Pat. No. 4,901,307, entitled "Spread Spectrum Multiple Access Communication System Using Satellite or Terrestrial Repeaters." Furthermore, for a description of the generation of signal waveforms for use in a CDMA communications system, reference is made to U.S. Pat. No. 5,103,459, entitled "System and Method for Generating Signal Waveforms in a CDMA Cellular System" and U.S. Pat. No. 5,883,888, entitled "Seamless Soft Handoff in a CDMA Cellular Communications System." The disclosures of the foregoing references are expressly incorporated by reference herein.

The heart of a typical wireless telecommunications system is the MSC that is connected to a plurality of base stations that are dispersed throughout the geographic area serviced by the system. The geographic area serviced by a wireless telecommunications system is partitioned into a number of spatially distinct areas called "cells." Each MSC is responsible for, among other things, establishing and maintaining calls between mobile devices and between a mobile device and a wireline terminal, which is connected to the system via the local and/or long-distance networks. An MSC is a telephone switch specialized for wireless and mobility support. An MSC performs various functions, including mobility management, call handoffs, call admission, call control, resource allocation, and so forth. The call is then relayed from the MSC to base stations and via wireless communications to the mobile device.

In FIG. 1, whenever the mobile device 102 activates or roams into a new MSC coverage area, i.e., the "cell" for which the MSC is responsible, the new MSC becomes the serving MSC. The mobile device transmits its stored identity to the new serving MSC via a base station 106. As shown in FIG. 1, the subscriber identity information is transmitted over a radio channel 108 in a format compliant with an air interface standard 105, e.g. ANSI/IS-41, and detected by an antenna 110 of base station 106.

Base station 106, in turn, transmits the subscriber identity information to the serving MSC 104, such as for example via communication line 112. The procedures and protocol for communication between the base station 106 and the MSC 104 have also been standardized. For an identification of industry standards relating to these communications, reference is made to TIA/EIA/IS634-A, "MSC-BS Interface for Public Wireless Communication Systems."

In order to provide mobile service to the newly registered mobile device 102, the serving MSC 104 transmits a Mobile Application Part (MAP) based signal, such as a registration notification signal (IS-41 message) or location update signal (GSM message), to a home location register (HLR) 116 via a signaling link such as a signal transfer point (STP) 114. An STP is a node in the signaling system 7 (SS7) telephone network that routes messages between exchanges and between exchanges and databases that hold subscriber and routing information. An HLR is one such database in a cellular system that contains all the subscribers within the provider's home service area. The data in the HLR is requested and transferred via SS7 to a VLR in the new area.

In the embodiment of FIG. 1, the STP 114 routes the MAP based signal to a gateway MSC 118. As shown in FIG. 1, the gateway MSC 118 can serve as a network switch for connecting to the public switched telephone network (PSTN) 120. SS7 is the protocol used in the PSTN for setting up calls and providing services. The SS7 network sets up and tears down the call, handles all the routing decisions and supports all modern telephony services, such as local number portability (LNP). LNP allows a telephone subscriber to port his/her phone number when that subscriber relocates to a different region of the country, even when the local area code may be different. The voice switches known as service switching points (SSPs) query service control point (SCP) databases using packet switches known as signal transfer points (STPs).

Accessing databases using a separate signaling network enables the system to more efficiently obtain static information such as the services a customer has signed up for and dynamic information such as ever-changing traffic conditions in the network. In addition, a voice circuit is not tied up until a connection is actually made between both parties. There is an international version of SS7 standardized by the ITU, and national versions determined by each country. For example, ANSI governs the US standard for SS7, and Telcordia (Bellcore) provides an extension of ANSI for its member companies.

The MAP based signal informs the HLR 116 of the network address associated with the MSC 104 currently serving the mobile device 102 and also request requisite subscriber information for providing mobile service to the roaming mobile device 102. The HLR 116 updates its database to store the network address representing the serving MSC 104 and also copies the requested subscriber information to the VLR 122 associated with the serving MSC 104. The network address representing the serving MSC 104 stored in the HLR 116 is later utilized by the mobile network to reroute any incoming call intended for the mobile device 102 to the serving MSC 104.

Accordingly, whenever a telecommunications subscriber dials a telephone number for the mobile device 102, the HLR 116 is queried by the mobile network to determine the current location of the mobile device 102. Utilizing the stored network address in HLR 116 representing the serving MSC 104, the HLR 116 requests a roaming number from the serving MSC 104 in response to the receipt of the query signal. The roaming number provided by the serving MSC 104 is then used by the telecommunications network to route the incoming signal towards the serving MSC 104. The serving MSC 104 then pages the mobile device 102 and accordingly establishes a voice connection with the mobile device 102, if available.

If the mobile device 102 roams out of serving MSC 104 coverage area and into another MSC 124 coverage area, MSC 104 will hand-off the communication to MSC 124 and base station 126. To ensure compatibility between two MSCs, the procedures and protocol for the format and transmission of messages have been standardized. For an identification of industry standards relating to these communications, reference is made to ANSI/IS-41, "Cellular Radio telecommunications Intersystem Operations."

Figure 2:
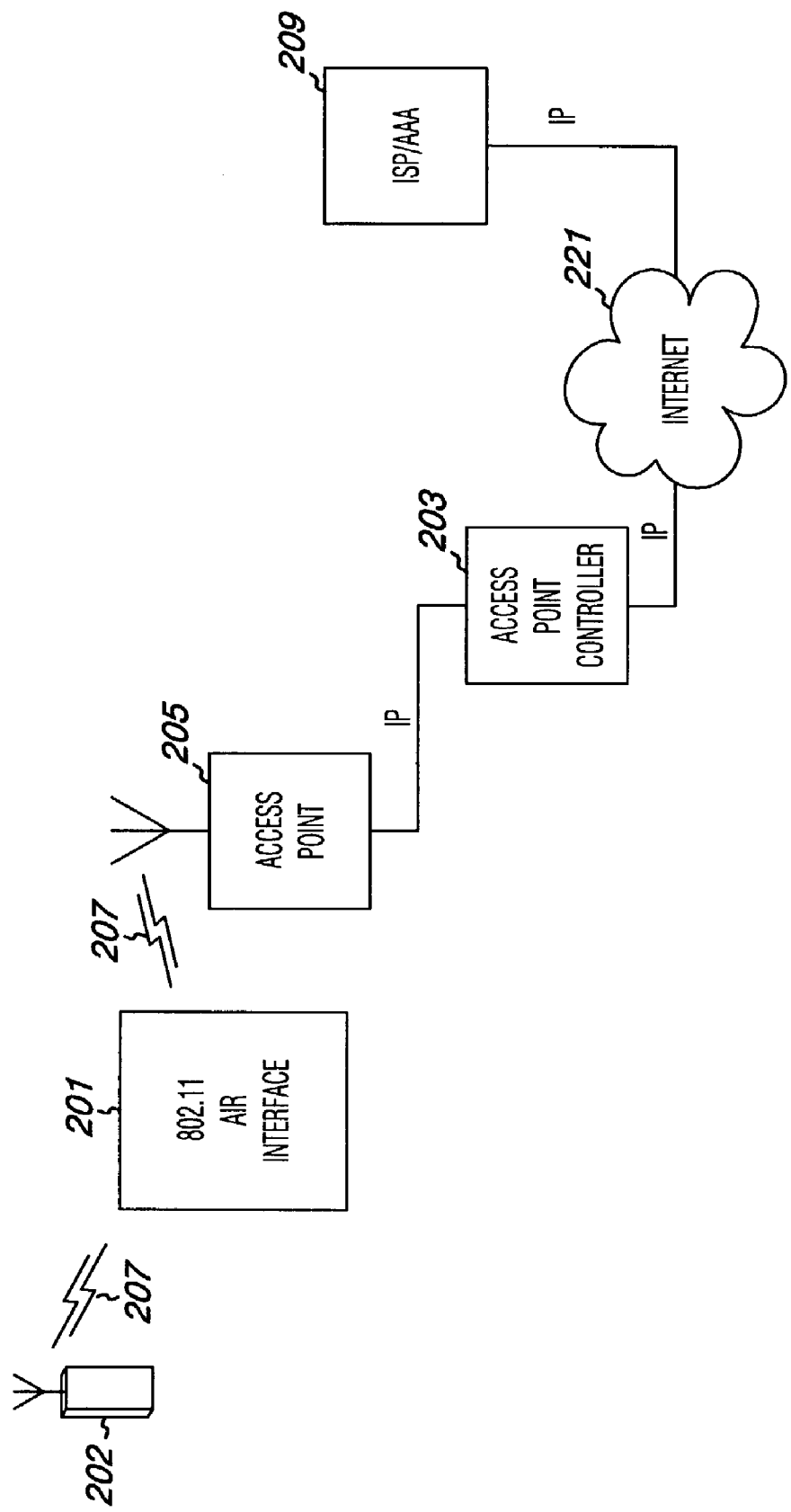
FIG. 2 illustrates an architecture for a wireless data network.

FIG. 2 illustrates an architecture for a wireless data network such as a wireless local area network (WLAN). The architecture of FIG. 2, however, is not limited to WLANs. 802.11 is a family of IEEE standards for WLANs. The IEEE 802.11a standard, for example, transmits in the 5 GHz frequency range and provides from 6 to 54 Mbps. The IEEE 802.11b standard transmits in the 2.4 GHz frequency range and provides from 1 to 11 Mbps. In FIG. 2, an 802.11 radio/air interface 201 between a mobile device and a home network is illustrated. In FIG. 2, as a mobile device 202 roams it attempts to connect to the available RF band in its current location. For example, when the mobile device 202 roams into an 802.11 environment the mobile device will authenticate and register with an authentication, authorization, accounting (AAA) function within the core network.

FIG. 2 illustrates a wireless 802.11 air interface 201 provides a signal link 207 between the mobile device 202 and an access point (AP) 205. The AP 205 serves a similar role to the base station described above in connection with FIG. 1. The AP 205 is linked to an access point controller (APC) 203. The APC 203 is connected to the AP 205 over a packet switched signal link, e.g. Internet protocol (IP) link. APC 203 provides a packet switched signal link, IP link, to the Internet 221 to connect packet switched signals to an internet service provider (ISP) 209 having an AAA function in the core, or home network, of the mobile device 202.

Figure 3A:
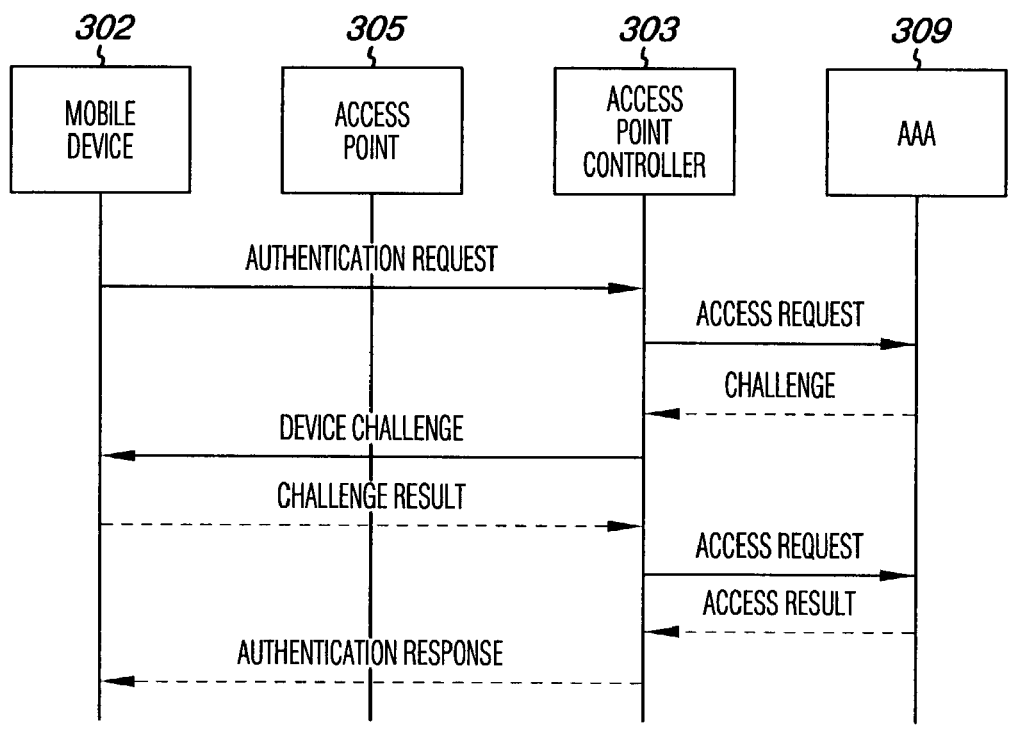
FIG. 3A illustrates a diagram which depicts the message flow involved in the authentication of a mobile device in the architecture depicted in FIG. 2.

FIG. 3A illustrates a diagram which depicts the message flow involved in the authentication of a mobile device in the architecture depicted in FIG. 2. As shown in FIG. 3A, a mobile device 302 sends an authentication request to the APC 303. The APC 303 sends an access request to the core network ISP which can access an AAA function database 309. A challenge is returned to the APC 303. The challenge is sent from the APC 303 to the mobile device 302. A challenge result is sent from the mobile device back to the APC 303 which sends an access request containing the challenge result to the AAA 309. An access result is provided back to the APC 303 and an authentication response sent to the mobile device 302.

Successful authentication will allow the mobile device 302 to have access through the APC 303 to the wireless data network. The access result returned from the AAA 309 service to the APC 303 will contain the profile information required by the APC 303 to determine what type of network access is allowed for the mobile device 302. This will, in effect, be a firewall function provided by the APC 303. The mobile device 302 will then register its location with the AAA 309.

Figure 3B:
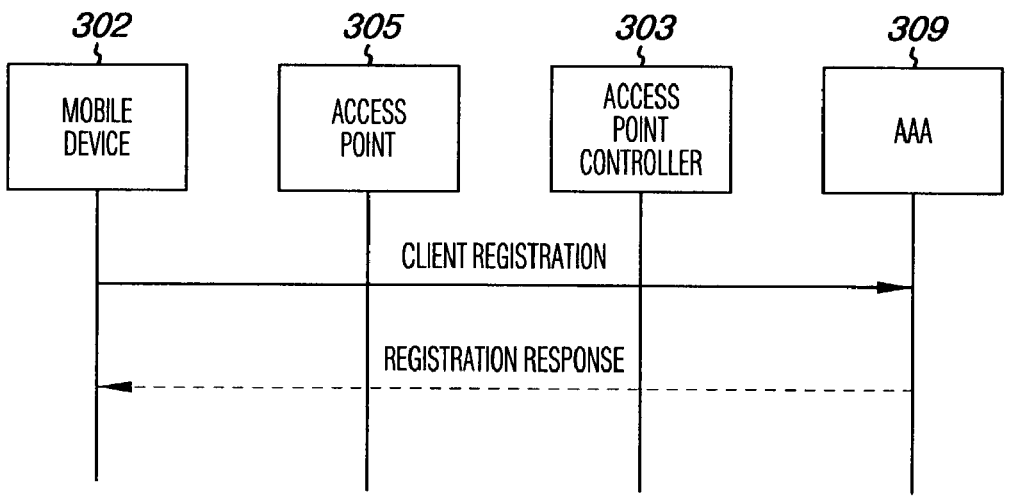
FIG. 3B illustrates a diagram which depicts the messaging that will occur for the registration of the mobile device with an authentication, authorization, and accounting device.

FIG. 3B illustrates a diagram which depicts the messaging that will occur for the registration of the mobile device 302 with the AAA 309. As shown in FIG. 3B, the mobile device 302 sends a client registration to the AAA 309 and the AAA 309 returns a registration response to the mobile device 302.

The client registration message will contain the IP address that was licensed to the mobile device 302 when it connects to the wireless data network. This address will be maintained by the AAA 309 for use in subsequent termination (connection) attempts. The registration response will contain profile information that is useful to the mobile device 302. To provide security to this information the mobile device 302 and the AAA 309 can utilize secure communication protocols when exchanging the information. The messages can be digitally signed using secrets shared between the mobile device 302 and the AAA 309 server. The registration will establish the location of the mobile device 302 and provide the profile information associated with the mobile device 302.

It is noted that a mobile device 302 can be allowed to register on a wireless data network (private or public) without necessitating that it be accompanied by a registration cancellation in a wireless voice network, e.g. cellular network as depicted in FIG. 1. Put another way, an 802.11 registration would not necessarily cause a registration cancellation in a CDMA voice domain. The mobile device 302 would be registered in both domains simultaneously.

Figure 4:
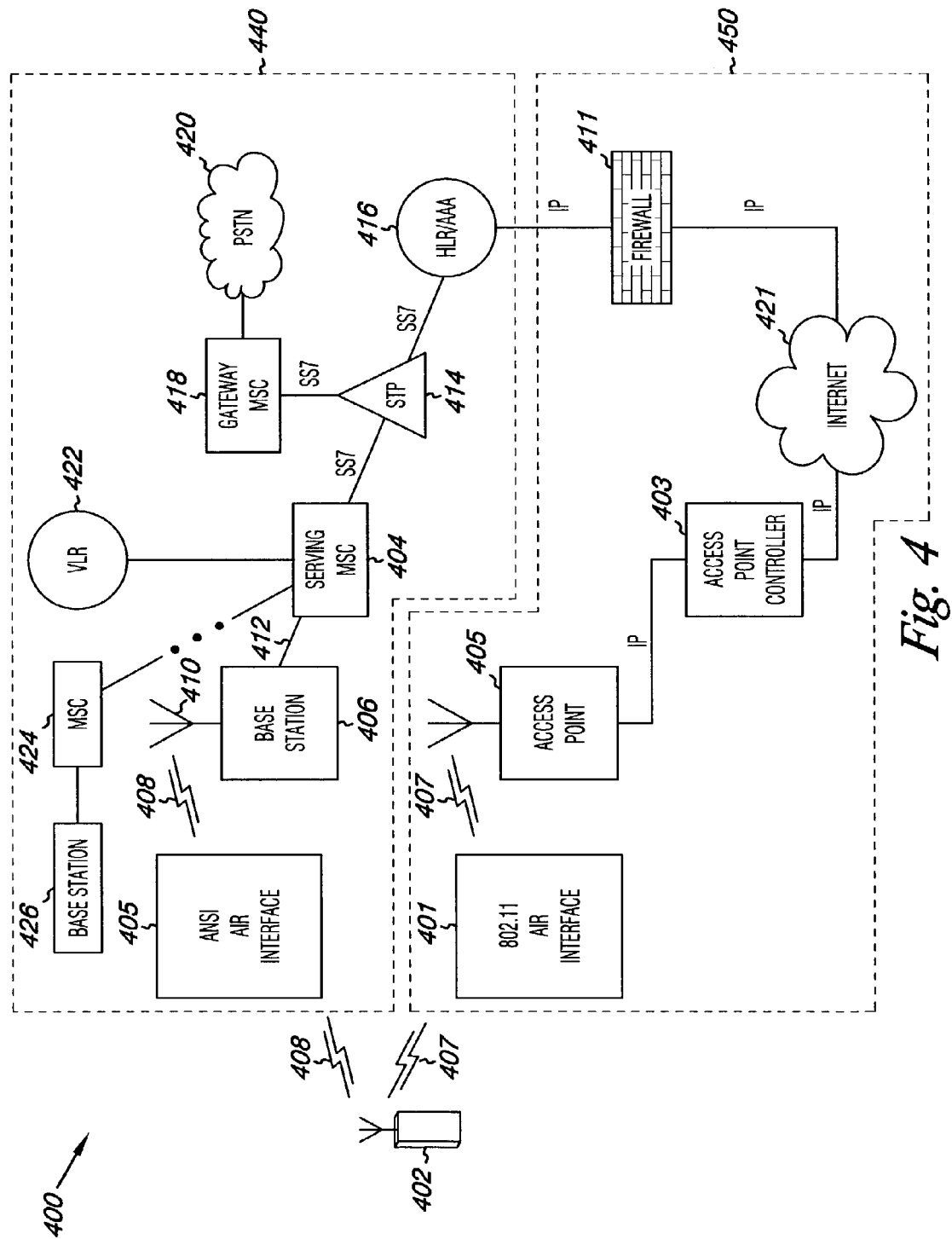
FIG. 4 illustrates an architecture embodiment which provides for the interoperability of a wireless voice network and wireless data network.

FIG. 4 illustrates an architecture embodiment which provides for the interoperability, compatibility, and/or coexistence of a wireless voice network and a wireless data network. In one embodiment, FIG. 4 illustrates an architecture which provides for the interoperability of a WLAN, e.g. an 802.11, data network with a voice wireless network, e.g. an ANSI or GSM network. The scope of the invention, however, is not so limited. That is, in various embodiments the network architecture of FIG. 4 can provide for the coexistence of a micro local data network deployment together with a macro wireless voice network.

As shown in FIG. 4, a mobile device 402 activates or roams into an MSC coverage area and transmits its stored subscriber identity to the new serving MSC 404 via a base station 406. The subscriber identity information is transmitted over a radio channel 408 in a format compatible with a cellular based network (GSM or ANSI/IS-41) air interface 403 and detected by an antenna 410 of base station 406. Base station 406, in turn, transmits the subscriber identity information to the serving MSC 404 via communication line 412.

In order to provide mobile service to the newly registered mobile device 402, the serving MSC 404 transmits subscriber identity information, such as a registration notification or location update signal, to a HLR 416 via a signaling link, e.g. STP 414. The data in the HLR 416 is requested and transferred via SS7 to a VLR 422 in the new area. A gateway MSC 418 serves as a network switch for connecting the public switched telephone network (PSTN) 420 to a wireless voice network. As shown in the architecture network of FIG. 4, in various embodiments the HLR 416 includes an HLR 416 with combined voice network HLR functions and AAA data network functions. That is, in various embodiments the HLR 416 is able to register both data network connections, e.g. an 802.11 connection, and voice network connections, e.g. an ANSI or GSM network connection. As such, in various embodiments an HLR/AAA 416 is provided which is operable to register subscriber information for both circuit switch (CS) and packet switch (PS) networks or environments.

In some embodiments, a data network AAA and a voice network HLR are provided separately and means, e.g. software, firmware, hardware, and/or combinations of thereof are provided as part of the network architecture such that an HLR is operable to initiate a message to the mobile device 402 through a wireless data network to indicate that a call is waiting to be transmitted to the mobile device 402 via a wireless voice network as the same have been described herein.

The combined HLR/AAA 416 embodiment is described for ease of reference. However, one of ordinary skill in the art will appreciate, from reading this disclosure, that the invention is not so limited. Within a voice network side of the architecture embodiment of FIG. 4, a MAP signal can inform the HLR/AAA 416 of the network address associated with the MSC 404 currently serving the mobile device 402 and can also request requisite subscriber information for providing mobile service to the roaming mobile device 402. The HLR/AAA 416 updates its database to store the network address representing the serving MSC 404 and also copies the requesting subscriber information to the VLR 422 associated with the serving MSC 404. The network address representing the serving MSC 404 stored in the HLR/AAA 416 is later utilized by the mobile network to route any incoming call intended for the mobile device 402 to the serving MSC 404.

When a telecommunications subscriber dials a telephone number for the mobile device 402, the HLR/AAA 416 is queried by the mobile voice network to determine the current location of the mobile device 402. Utilizing the stored network address in HLR/AAA 416 representing the serving MSC 404, the HLR/AAA 416 requests a roaming number from the serving MSC 404 in response to the receipt of the query signal. The roaming number provided by the serving MSC 404 is then used by the telecommunications or voice network to route the incoming signal towards the serving MSC 404. The serving MSC 404 then pages the mobile device 402 and accordingly establishes a voice connection with the mobile device 402, if available. The architecture embodiment of FIG. 4 further illustrates an additional MSC 424 and base station 426 representing that if the mobile device 402 roams out of serving MSC's 404 coverage area and into another coverage area, MSC 404 can hand-off the communication to MSC 424 and base station 426.

As introduced herein, the architecture embodiment of FIG. 4 provides for the interoperability, compatibility, and/or coexistence of a wide area network (WAN) or wireless voice network, e.g. a macro-type ANSI or GSM network environment, with a wireless data network or wireless local area network (WLAN) such as a metropolitan area network (MAN), 802.11 LAN, and/or Bluetooth personal area network (PAN), among others. One of ordinary skill in the art will recognize that the scope of embodiments in not limited to the network types listed herein.

By way of example and not by way of limitation, the architecture embodiment of FIG. 4, illustrates an 802.11 WLAN data network side providing an interface between the mobile device 402 and a core, or home network of the mobile device. As previously stated, as the mobile device 402 roams it attempts to connect to the available RF band in its current location. When the mobile device 402 roams into a wireless data network environment, e.g. an 802.11 environment, the mobile device will authenticate and register with an AAA function within the core network. In the embodiment of FIG. 4, the mobile device will authenticate with HLR/AAA 416.

In the embodiment of FIG. 4, a wireless 802.11 air interface 410 provides a signal link 407 for connectivity between the mobile device 402 and an access point (AP) 405. As described above, the AP 405 can link to an access point controller (APC) 403. The APC 403 is connected to the AP 405 over a packet switched signal link, e.g. IP link. APC 403 provides a packet switched signal link, IP link, to the Internet 421 to connect packet switched signals to the core, or home network, of the mobile device 402. As illustrated in the architecture embodiment of FIG. 4, the packet switched signals can connect through a firewall 411 to the HLR/AAA 416 shared with the wireless voice network.

Thus, in various embodiments the architecture of FIG. 4 facilitates a compatible or interoperable registration of mobile device 402 subscriber information for both circuit switch (CS) and packet switch (PS) networks or environments.

In the embodiment of FIG. 4, the HLR/AAA 416 provides both HLR and AAA functions to allow co-registration of a mobile device 402 in both a wireless data network and a macro carrier, e.g. ANSI or GSM, network environment. However, as noted above, embodiments of the invention allow for a data network AAA and a voice network HLR to be provided separately and for there to exist within the architecture means, e.g. software, firmware, hardware, and/or combinations of thereof, by which the HLR is operable to initiate a message to the mobile device 402 through the wireless data network to indicate that a call is waiting to be transmitted to the mobile device 402 via the wireless voice network.

According to various embodiments, an architecture is provided in which a data call to a mobile device, capable of voice and data functions, can be suspended in order to complete a voice call. According to various embodiments, the data session can be resumed upon completion of the voice call. In various embodiments, a mobile device attached to a data call, e.g. not in the proper state to receive voice calls, has the ability to suspend the data call to terminate (connect) a voice call. In various embodiments, an HLR or HLR/AAA can send a message to the mobile device via the Internet instructing the mobile device to suspend its wireless data activity, e.g. 802.11 data activity, and for the mobile device to re-enter the wireless voice network.

Figure 5:
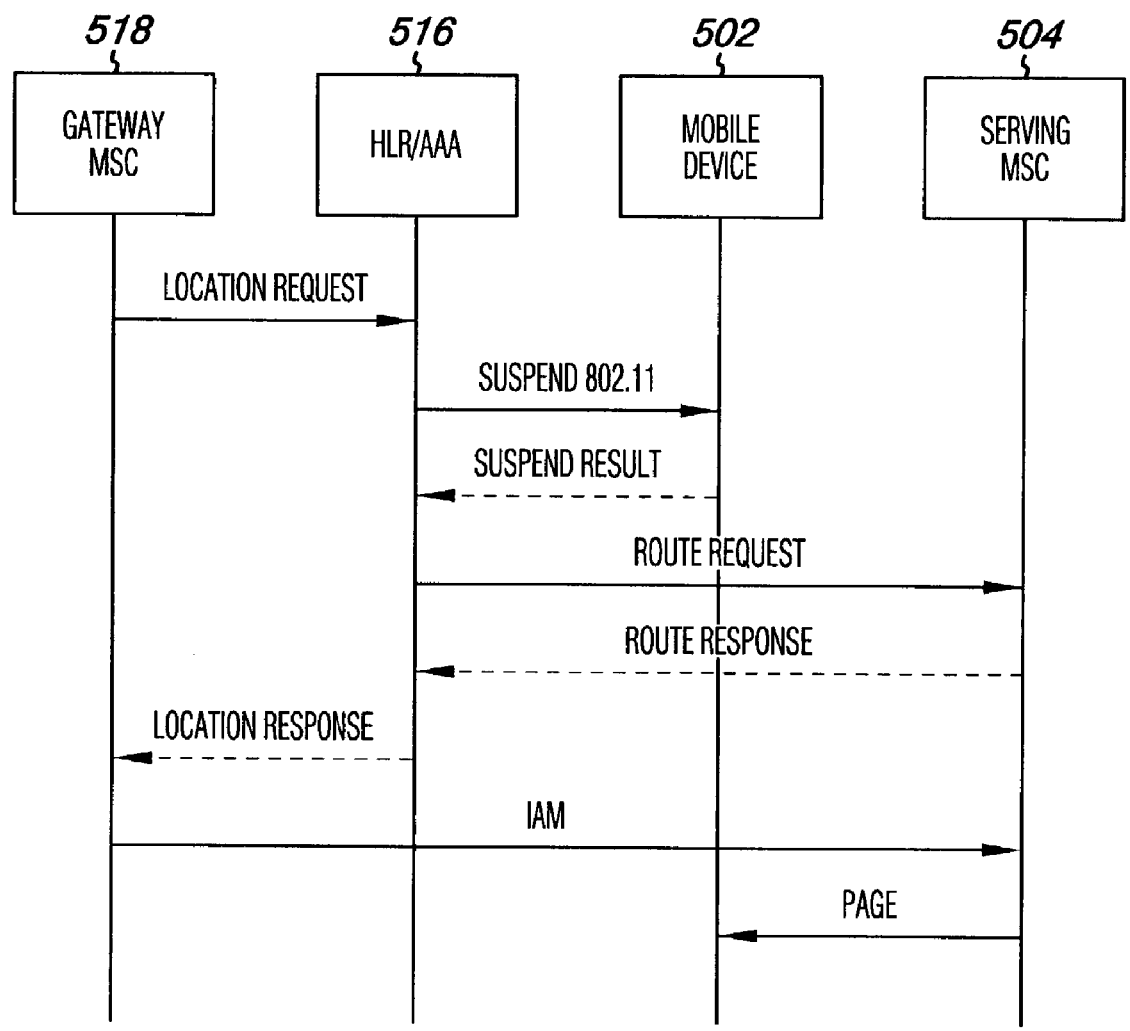
FIG. 5 illustrates a diagram embodiment which depicts the flow of messages to support the interoperability of a voice and data wireless network.

FIG. 5 is a diagram which depicts an embodiment for the flow of messages to support the termination (connection) of a voice call from a macro cellular network to a mobile device while the mobile device is registered/attached in a wireless data network. The wireless data network does not have to be a carrier network. Embodiments of the invention apply to the coexistence of various types of voice and data network combinations.

As shown in FIG. 5, when an attempt is made to terminate a call to a phone number associated with a mobile device 502, the flow of events includes the HLR/AAA 516 receiving a location request message from a gateway MSC 518. This becomes a route message to the serving MSC 504 associated with the mobile device 502. In the embodiment of FIG. 5, a mobile device is treated as being attached to an 802.11 network for purposes of illustration and not by way of limitation. If the mobile device 502 is in a data session over an 802.11 WLAN, the mobile device 502 will not be in the proper state to receive voice calls. In other words, although the mobile device 502 is capable of multiple network type connections, the radio of the mobile device 502 will not be able to communicate on both networks at the same time.

Accordingly, as shown in the embodiment of FIG. 5, the HLR/AAA 516 will send a suspend 802.11 message to the mobile device 502 via the Internet telling it to suspend its 802.11 data activity and re-enter the voice network. The mobile device 502 will send a suspend result back to the HLR/AAA 516. As shown in the embodiment of FIG. 5, upon receipt of the response from the mobile device 502 the HLR/AAA 516 will send a route request message to the serving MSC 504. The serving MSC 504 will send a route response to the HLR/AAA 516 reserving resources to terminate the voice call. That is, the serving MSC 504 will allocate a temporary local directory number (TLDN) for the mobile device 502 and return the route request.

As shown in the embodiment of FIG. 5, the HLR/AAA 516 will return a location response to the gateway MSC 518. The gateway MSC 518 will return an initial address message (IAM) to the serving MSC 504. The voice call, or voice session, will then be connected to the serving MSC 504 and the mobile device 502 will be paged by a voice connection signal on the voice network. The voice termination (e.g. connection) will occur when the subscriber takes the phone off-hook.

In various embodiments, the suspend request is sent out in parallel with the route request to avoid a time out of the location request by the gateway MSC 518. In various embodiments, the mobile device 502 includes a timeout function to enable a decision to return to the wireless data, e.g. 802.11, activity. And, in various embodiments, multiple nearly simultaneous termination attempts are managed by providing a queue for overflow termination attempts.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b) requiring an Abstract that will allow the reader to quickly ascertain the nature of the technical disclosure. It is submitted with the understanding that it will not be used to limit the scope of the claims.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A wireless system, comprising:
   a voice network;
   a data network provided separately from the voice network;
   a home location register (HLR) in communication with the voice network and the separately provided data network; and
   wherein the HLR is operable to:

initiate a message to a mobile device, via the separately provided data network, that a voice session is waiting to be transmitted to the mobile device via the voice network;

initiate a suspend data activity request through the data network to a mobile device; and initiate a route request in parallel with the suspend data activity request to a mobile switching center (MSC).

2. The wireless system of claim 1, wherein a mobile device includes a handheld multifunction device capable of one network connection at a time.

3. The wireless system of claim 1, wherein the HLR includes an HLR/authentication, authorization, accounting (AAA) database capable of registering subscriber information for both a voice network and a separately provided data network.

4. The wireless system of claim 3, wherein a mobile device is registered in both the voice network and the separately provided data network simultaneously.

5. The wireless system of claim 4, wherein the voice network includes a code division multiple access (CDMA) radio access interface.

6. The wireless system of claim 1, wherein the separately provided data network includes an 802.11 wireless local area network (WLAN).

7. The wireless system of claim 1, wherein the separately provided data network includes a Bluetooth radio access interface.

8. A wireless architecture, comprising:

a mobile device operable to receive voice information via a voice network and data information via a data network that is provided separately from the voice network; and a home location register/authentication, authorization, accounting (HLR/AAA) database operably coupled to both the voice network and the separately provided data network and operable to perform HLR functions and AAA functions for both the voice network and the separately provided data network; and wherein the HLR/AAA database is operable to, based on a location request message received from a gateway mobile switching center (MSC):

initiate a suspend data activity request through the data network to the mobile device; and initiate a route request in parallel with the suspend data activity request to a serving mobile switching center (MSC).

9. The wireless architecture of claim 8, wherein the voice network includes a base station, in communication with the serving mobile switching center (MSC) connected by a signaling system to a signal transfer point, the signal transfer point connected by the signaling system to the HLR/AAA and the gateway MSC having a connection to a telephone network.

10. The wireless architecture of claim 8, wherein the separately provided data network includes a data network having an access point connected to an access point controller (APC) via an Internet Protocol link (IP), the APC connected to an Internet connection, and the Internet connection provisioned by an Internet service provider (ISP) of the mobile device.

11. The wireless architecture of claim 8, wherein the HLR/AAA includes an HLR/AAA operable to initiate a message to the mobile device, via the separately provided data network, indicating that a voice session is waiting to be terminated to the mobile device via the voice network.

12. The wireless architecture of claim 8, wherein the voice network includes a global system for mobile (GSM) communications network.

13. The wireless architecture of claim 8, wherein the HLR/AAA is interfaced through a firewall to an Internet connection.

14. A wireless architecture, comprising:

a voice network operable to connect to a mobile device;

a data network provided separately from the voice network and operable to connect to the mobile device; and logic means operable to:

maintain registration of mobile device subscriber information for both the voice network and the separately provided data network;

initiate a suspend data activity request through the data network to the mobile device; and initiate a route request in parallel with the suspend data activity request to a serving mobile switching center (MSC).

15. The wireless architecture of claim 14, wherein logic means includes logic means operable to signal the mobile device, via the data interface, that a voice session is waiting to be connected to the mobile device.

16. A method for wireless operation between a voice network and a data network, comprising;

interfacing a voice network to a mobile device;

signaling the mobile device, via a wireless data network that is provided separately from the voice network, that a voice call is attempting to connect with the mobile device via the voice network; and wherein, based on a location request message received from a mobile switching center, initiating a suspend data activity message in parallel with a route request message from a home location register (HLR).

17. The method of claim 16, wherein the method further includes providing concurrent registration of the mobile device, accessible by both the voice and the separately provided data network.

18. The method of claim 17, wherein providing concurrent registration of the mobile device, accessible by both the voice and the separately provided data network, includes registering a data network location for the mobile device in an HLR/AAA.

19. The method of claim 18, wherein registering the data network location includes registering an IP address assigned to the mobile device upon connection to the separately provided data network.

20. The method of claim 16, wherein the method further includes:

receiving the location request message from a gateway mobile switching center;

sending the suspend data activity message from the home location register (HLR) to the mobile device;

sending the route request message from the HLR to a serving mobile switching center; and connecting the call to the mobile device via the voice network.

21. The method of claim 20, wherein initiating a suspend data activity message from an HLR includes initiating a suspend data activity from an HLR/ authentication, authorization, accounting (AAA) device.

22. The method of claim 20, wherein initiating a route request message from the HLR includes initiating a route request message from an HLR/AAA device.

23. The method of claim 20, wherein connecting the call to the mobile device via the voice network includes queuing suspended data activity.

24. The method of claim 20, wherein connecting the call to the mobile device via the voice network includes provisioning a temporary local directory number (TLDN) from the serving mobile switching center (MSC) to an HLR/AAA.

25. The method of claim 24, wherein the method further includes;
providing a location response message from the HLR/AAA to the gateway MSC;
connecting the call to the serving MSC; and
paging the mobile device on the voice network.

26. A computer readable medium encoded with instructions capable of being executed by a computer for causing a device to perform a method, comprising:
signaling a suspend data activity request from an HLR/AAA through a data network to a mobile device;
signaling a route request to a mobile switching center (MSC) in parallel with the suspend data activity request; and
connecting a call to the mobile device via a voice network that is provided separately from the data network.

27. The medium of claim 26, wherein the method further includes:
signaling a suspend result from the mobile device to the HLR/AAA;
signaling a route request in parallel with the suspend data activity request from the HLR/AAA to a serving mobile switching center (MSC); and
signaling a route response from the serving MSC to the HLR/AAA.

28. The medium of claim 27, wherein the method further includes;
signaling a location response from the HLR/AAA to a gateway MSC;
signaling an initial address message (IAM) from the gateway MSC to the serving MSC; and
signaling a page from the serving MSC to the mobile device.

29. The medium of claim 26, wherein the medium further includes instructions to:
signal a client registration from the mobile device to the HLR/AAA; and
signal a registration response from the HLR/AAA to the mobile device.

30. The medium of claim 26, wherein the medium further includes instructions to:
transmit an authentication request from the mobile device to an access point controller (APC);
transmit an access request from the APC to the HLR/AAA;
transmit a challenge from the HLR/AAA to the APC;
transmit a device challenge from the APC to the mobile device; and
transmit a challenge result from the mobile device to the APC.

31. The medium of claim 30, wherein the medium further includes instructions to:
transmit an access request from the APC to the HLR/AAA;
transmit an access result from the HLR/AAA to the APC; and
transmit an authentication response from the APC to the mobile device.

* * * * *